United States Patent
Roffman et al.

(10) Patent No.: US 6,802,606 B2
(45) Date of Patent: Oct. 12, 2004

(54) MULTIFOCAL CONTACT LENS PAIRS

(75) Inventors: Jeffrey H. Roffman, Jacksonville, FL (US); Scott C. Durland, Jacksonville, FL (US); Timothy R. Poling, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 10/357,873

(22) Filed: Feb. 4, 2003

(65) Prior Publication Data

US 2004/0150790 A1 Aug. 5, 2004

(51) Int. Cl.$^7$ ................................................. G02C 7/04
(52) U.S. Cl. .................... 351/161; 351/160 R; 351/177
(58) Field of Search ................................ 351/161, 177, 351/160 R, 162, 160 H, 168–9, 172

(56) References Cited

U.S. PATENT DOCUMENTS

| | | | | |
|---|---|---|---|---|
| 5,485,228 A | | 1/1996 | Roffman et al. | 351/161 |
| 5,608,471 A | * | 3/1997 | Miller | 351/161 |
| 6,179,420 B1 | | 1/2001 | Roffman et al. | 351/161 |
| 6,199,984 B1 | * | 3/2001 | Menezes | 351/169 |
| 6,364,483 B1 | * | 4/2002 | Grossinger et al. | 351/161 |
| 6,652,095 B2 | * | 11/2003 | Tung | 351/161 |
| 2001/0033363 A1 | * | 10/2001 | Chateau et al. | 351/216 |

FOREIGN PATENT DOCUMENTS

WO    WO 95/26518 A1    10/1995

* cited by examiner

Primary Examiner—Jordan M. Schwartz
Assistant Examiner—Jessica Stultz

(57) ABSTRACT

The invention provides a progressive multifocal ophthalmic lens pair in which the dominant eye lens incorporates more distance vision correction than does the lens for the non-dominant eye.

6 Claims, 2 Drawing Sheets

MULTIFOCAL CONTACT LENS PAIRS

FIELD OF THE INVENTION

The invention relates to multifocal ophthalmic lenses. In particular, the invention provides pairs of contact lenses for individuals that provide correction for presbyopia.

BACKGROUND OF THE INVENTION

As an individual ages, the eye is less able to accommodate, or bend the natural lens, to focus on objects that are relatively near to the observer. This condition is known as presbyopia. Similarly, for persons who have had their natural lens removed and an intraocular lens inserted as a replacement, the ability to accommodate is absent.

Among the methods used to correct for the eye's failure to accommodate is the use of lenses that have more than one optical power. In particular, contact and intraocular lenses have been developed in which zones of distance, near, and intermediate power are provided. Examples of such lenses are found in U.S. applications Ser. Nos. 10/285,054, 10/284,613 and 10/284,702 respectively, which are incorporated herein in their entireties by reference.

It is known that each individual has a dominant eye that predominates for distance vision. The dominant eye is the eye that would be used for leading vision in looking through a telescope, monocular microscope, gunsight, or the like. The present invention utilizes the fact that individuals have a dominant eye in designing a lens pair for the individual.

DETAILED DESCRIPTION OF THE INVENTION AND PREFERRED EMBODIMENTS

The invention provides a progressive multifocal ophthalmic lens pair, and methods for producing the lens pair, which corrects for the lens wearer's presbyopia. In the lens pairs of the invention, the dominant eye incorporates more distance vision correction than does the lens for the non-dominant eye.

Thus, in one embodiment, the invention provides an ophthalmic lens pair, comprising, consisting essentially of, and consisting of a first lens having a first optic zone comprising a progressive addition power zone having a first power profile and a second lens having a second optic zone comprising a progressive addition power zone having a second power profile, wherein the first and second power profiles are different.

By "ophthalmic lens" is meant a contact, intraocular, onlay lens or the like. Preferably, the lenses of the invention are contact lenses. By "distance optical power," "distance vision power" and "distance power" is meant the amount of refractive power required to correct the wearer's distance vision acuity to the desired degree. By "near optical power," "near vision power" and "near power" is meant the amount of refractive power required to correct the wearer's near vision acuity to the desired degree.

By "progressive addition power" is meant power that, as one moves radially outward from the center of the optic zone to the periphery, continuously and progressively changes from near through intermediate vision power to distance vision power or changes from distance to intermediate to near vision power. By "power profile" is meant the power distribution within a zone of progressive addition power or progressive addition power zone.

In the lens pair of the invention, the progressive addition power zone power profiles differ between the lenses. More specifically, the power profile for the lens used in the dominant eye is such that the progressive addition power zone provides more distance power than does the progressive addition power zone for the non-dominant eye lens. The non-dominant eye lens has more near power in the progressive addition power zone. It is a discovery of the invention, by providing this greater area of distance vision power and near vision power for the dominant and non-dominant eyes respectively, improved distance and near vision for the lenses' wearer is provided. The difference in the power profiles is achieved by deviating the radial position of the endpoint, meaning the point in the power progression at which there is about one-half of the add power within the power profiles. Preferably, the endpoint for the distance vision area is shifted about 0.1 to about 1.5 mm toward the optic zone periphery in the lens for the dominant eye.

Figure 1:
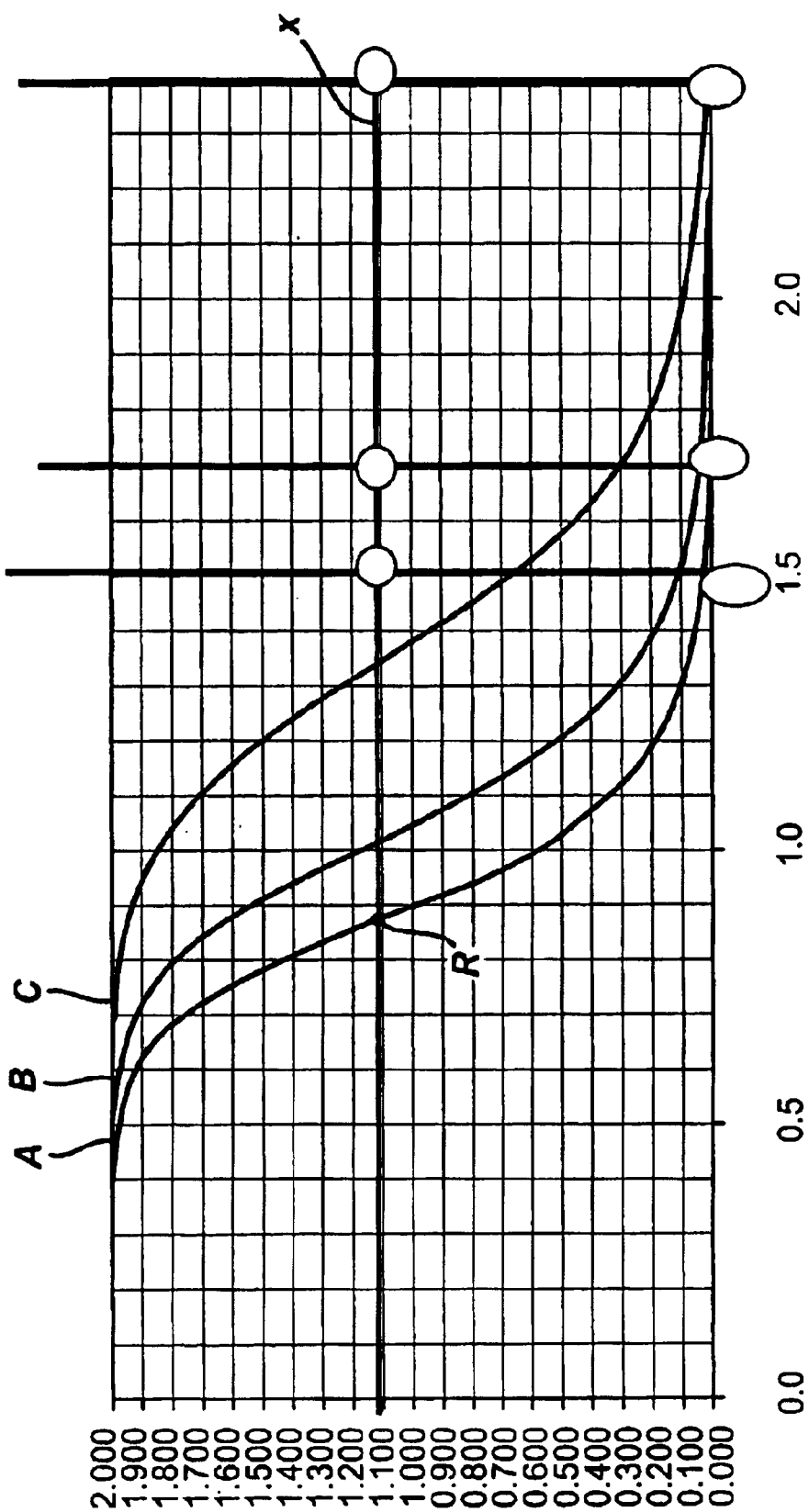
FIG. 1 is a graph depicting progression profiles for progressive addition power zones useful in lenses of the invention.

FIG. 1 depicts the power profile for three progressive addition power zones useful in the invention, each of which progresses from near power at the center of the center of the optic zone to distance power at the periphery. The x axis of the graph is the height, or distance, from the lens center 0. The y axis is the instantaneous add power at any point x along the power progression. Horizontal line X in FIG. 1 is the mid-point in the power transition for distance to near optical power. For power profile A, the endpoint R is such that additional distance power is provided in that profile as compared to power profiles B and C. Thus, in lenses of the invention, the lens for the dominant eye in a lens pair would preferably incorporate profile A versus B or C, or less preferably profile B versus C. The non-dominant eye preferably would incorporate profile C, and less preferably B provided that the dominant eye profile was A.

Figure 2:
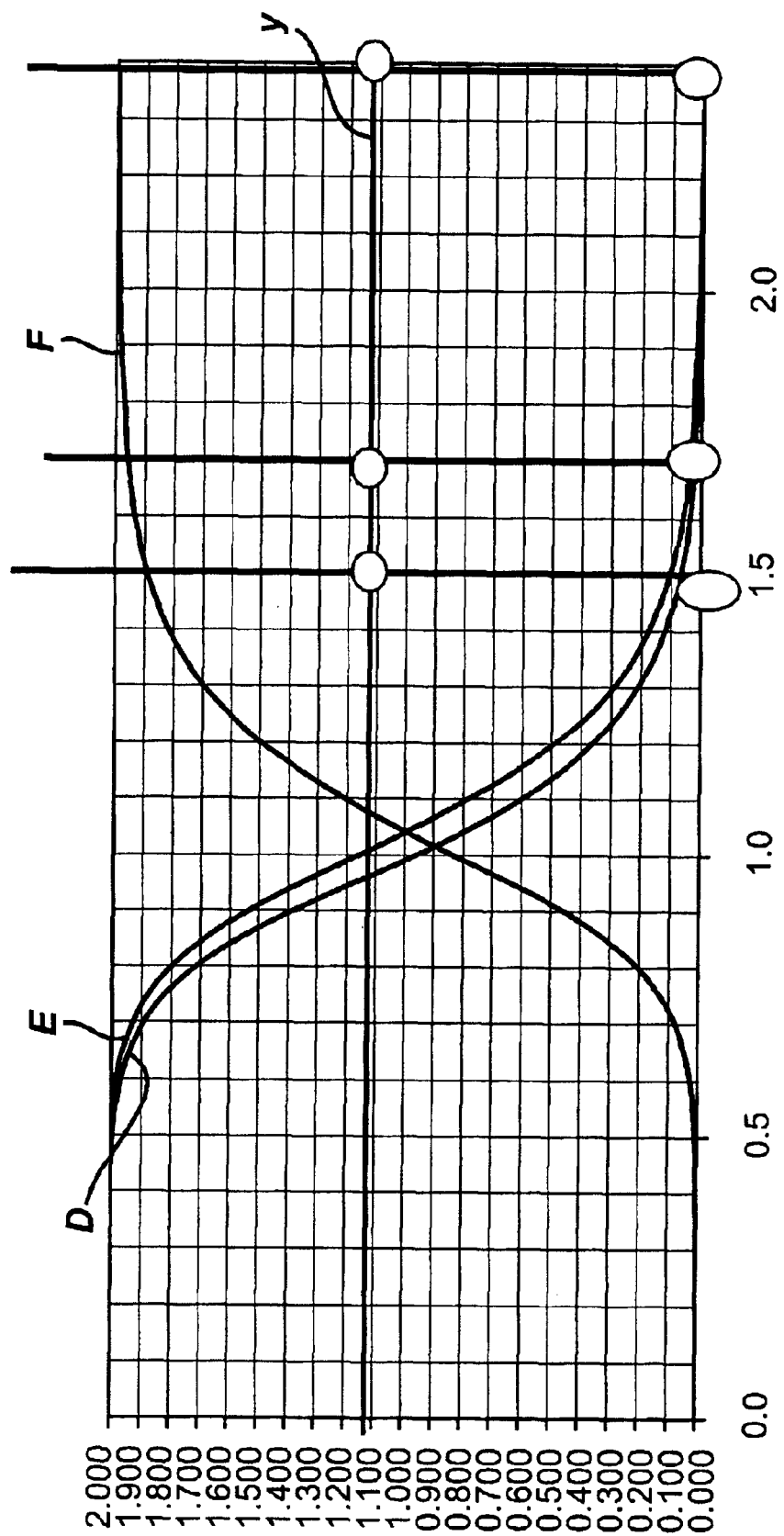
FIG. 2 is a graph depicting additional progression profiles for progressive addition power zones useful in lenses of the invention.

FIG. 2 depicts alternative power profiles for three progressive addition power zones useful in the invention. Horizontal line Y in FIG. 2 is the mid-point in the power transition for distance to near optical power. The depicted profiles are disparate in that not all progress from near to distance vision as one moves from the center of the optic zone to the periphery of the zone. In lenses of the invention, one lens may incorporate profiles D or E and the second lens of the pair may incorporate profile F to provide a disparate lens pair. Profile F preferably is to be worn by the dominant eye with Profiles D or E worn by the non-dominant eye.

A pair of contact lenses is provided by the invention, one lens to be worn in the dominant eye and one to be worn in the non-dominant eye. For a lens pair consistent with the embodiment of FIG. 1, the lenses worn by both the dominant and non-dominant eyes contain power that progresses from near power at the center of the optic zone to distance power at the periphery. For a lens pair consistent with the embodiment of FIG. 2, the lens worn by the dominant eye has a surface with distance power at the center of the optic zone progressing to near power as one moves radially from the center of the optic zone.

The lens worn by the non-dominant eye of the embodiment of FIG. 2 also has a surface with a central optic zone with the desired progressive addition power and power profile. The progressive addition power moves from near to distance vision power as one moves radially from the center of the optic zone. One of the lenses may have distance vision power at its center progressing to distance vision at the periphery and the other lens has near vision power at its center progressing to distance vision power at the periphery.

In the lenses of the invention, the progressive addition power may be on the object-side, or front, surface, the eye-side, or rear, surface, or both surfaces. In the lenses of the invention, the distance, near, and intermediate optical powers are spherical or toric powers.

The progressive addition power may be calculated by any known method. One preferred method provides progressive addition power in an optic zone wherein the speed and the contour for the zone is determined by the following equation:

$$\text{Add}_{(x)} = \text{Add}_{peak} * (1/(a*(1+(x/x_c)^{2n}))) \qquad \text{(I)}$$

wherein:
  $\text{Add}_{(x)}$ is actual instantaneous add power at any point x on a surface of the lens;
  x is a point on the lens surface at a distance x from the center;
  a is a constant and preferably is 1;
  $\text{Add}_{peak}$ is the full peak dioptric add power, or add power required for near vision correction;
  $x_c$ is the cutoff semi-diameter or the midpoint in the power transition from distance to near power, or near to distance power;
  n is a variable between 1 and 40, preferably between 1 and 20; and
  Add is a value that is equal to the difference in power between the near vision power and distance vision power of the lens.

In Equation I, n is the variable that controls the slope of the progression from near to distance vision power and distance to near vision power in the lens. The less the value of n, the more gradual the progression will be. By "speed" or "contour" is meant the slope of the power change from near to distance power.

In another embodiment, progressive addition power in an optic zone is provided wherein the speed and the contour for the zone is determined by the following equation:

$$\text{Add}_{(x)} = \text{Add}_{peak} * (1/(a*(1+(x/x_c)^2)*n) \qquad \text{(II)}$$

wherein:
  $\text{Add}_{(x)}$ is actual instantaneous add power at any point x on a surface of the lens;
  x is a point on the lens surface at a distance x from the center;
  a is a constant and preferably is 1;
  $\text{Add}_{peak}$ is the full peak dioptric add power;
  $x_c$ is the cutoff semi-diameter;
  n is is a variable between 1 and 40, preferably between 1 and 20; and
  Add is a value that is equal to the difference in power between the near vision power and distance vision power of the lens.

In yet another embodiment, the speed and a contour for the zone is determined by the following equation:

$$\text{Add}_{(x)} = \text{Add}_{peak} * (1/(a*(1+(x/x_c)^d)*n) \qquad \text{(III)}$$

wherein:
  $\text{Add}_{(x)}$ is actual instantaneous add power at any point x on a surface of the lens;
  x is a point on the lens surface at a distance x from the center;
  a is a constant and preferably is 1;
  d is an arbitrary value between 1 and 40;
  $\text{Add}_{peak}$ is the full peak dioptric add power;
  $x_c$ is the cutoff semi-diameter;
  n is between 1 and 40, preferably between 1 and 20; and
  Add is a value that is equal to the difference in power between the near vision power and distance vision power of the lens.

Equations I through III each have a value of n that is the same on either side of $x_c$. As an alternative, the value of n can be a first value when $x<x_c$ and second value for $x>x_c$. In this embodiment, $x=x_c$, n may be the first or second value.

In still another embodiment, the invention provides a lens having an optic zone with a central zone of progressive addition power, wherein a diameter of the central zone is about 2.5 mm or less. In such embodiments, the near vision power is placed in the center of central zone. The size of the central zone for a lens designed in accordance with this embodiment invention will be determined based upon the lens wearer's pupil diameter viewed at at least two different luminance levels. The measured pupil diameter may be an actual measurement of an individual's pupil or mean diameters based on measurements of a population of individuals. Preferably, the pupil is measured at low, intermediate and high luminance, which correspond to 2.5 cd/m², 50 cd/m², 250 cd/m², respectively, using any suitable instrument, such as a pupillometer. Alternatively, the central zone diameter is based on available data of pupil size as a function of age, add power, or both. Pupil size data is available from a number of sources including, without limitation, U.S. Pat. Nos. 5,488,312, 5,682,223, 5,835,192, and 5,929,969 incorporated herein in their entireties.

One surface of the lens may provide the progressive addition power zone and the other surface may incorporate cylinder power or progressive cylinder power in order to correct the wearer's astigmatism. Alternatively, the cylinder power may be combined with the progressive addition power, on the front surface or back surface.

By "progressive cylinder power" is meant that there is a continuous, progressive change in cylinder power from the optical center of the lens to the periphery of the optic zone. The cylinder power may increase or decrease as one moves from the optical center to the periphery. In yet another alternative embodiment, the lenses of the invention provide a progressive cylinder power and a progressive axis. By "progressive axis" is meant that the axis of the cylinder power continuously changes over a defined range as one moves from the optical center of the lens to the periphery of the optic zone. The cylinder power may increase or decrease as one moves from the optical center to the periphery.

The cylinder power of the lens may be varied according to the following equation:

$$y = \left[\left[\frac{8A^3}{4A^2 + P(X+K)^2} \times Cyl\right]^s\right] \qquad \text{(IV)}$$

wherein y is the instantaneous cylinder power at any point x on the lens;
  P controls the width of the cylinder power region of the lens and is a value greater than 0, preferably 1;

A is a constant, preferably 0.5;

K controls displacement of the peak cylinder power and may be a value from +4 to −4;

S controls the functions endpoints and may be a value from 1 to 50; and

Cyl is the maximum cylinder power of the lens.

Equation IV provides a progressive cylinder power that decreases as it moves from the center of the optic zone, or optical center of the lens, to the lens periphery.

A progressive cylinder power that increases as it moves from the center of the optic zone, or optical center of the lens, to the lens periphery may be provided by the following equation:

$$y = Cyl - \left[\left[\frac{8A^3}{4A^2 + P(X+K)^2}\right]^S \times Cyl\right] \quad (V)$$

wherein the values and definitions for y, A, P, X, K and Cyl are the same as for Equation IV.

Yet another equation useful for providing progressive cylinder power is:

$$y = ((1-P)^x) \times Cyl \quad (VI)$$

wherein:

y is the instantaneous cylinder power at any point x;

P is the pupil fraction and may be any value from 0 to 1;

x is a value of 0.0 to 20; and

Cyl is the maximum cylinder power.

Equation VI provides for decreasing cylinder power as one moves from the center of the optic zone. The following equation provides for increasing power:

$$y = Cyl - ((1-P)^x) \times Cyl \quad (VII)$$

Yet another equation that is useful in providing progressively decreasing power from the center of the optic zone is:

$$y = |Sin(P)^x| \times Cyl \quad (VIII)$$

and for increasing cylinder power:

$$y = Cyl - |Sin(P)^x| \times Cyl \quad (IX)$$

wherein y is the instantaneous cylinder power at any point x of the lens;

P is the pupil fraction and is 90 to 180 degrees;

x is a value from 0.0 to 20; and

Cyl is the maximum cylinder power of the lens.

Yet additional examples of equations that may be used to design a progressive cylinder power that decreases from the center of the optic zone to the periphery are:

$$y = Cyl \times \left(\frac{1}{(a \times (1 + (x/x_c)^{2n}))}\right) \quad (X)$$

$$y = Cyl \times \left(\frac{1}{(a \times (1 + (x/x_c)^2) \times n)}\right) \text{ and} \quad (XI)$$

$$y = Cyl \times \left(\frac{1}{(a \times (1 + (x/x_c)^d) \times n)}\right) \quad (XII)$$

in each of which, wherein:

y is the instaneous cylinder power at any point x;

$x_c$ is the 50% cutoff in the filter transition, or position in x with ½ of the cylinder peak power;

a is a constant and preferably is 1;

n controls the steepness of the transition and is a value of 1 to 40;

Cyl is the maximum cylinder power; and

X is the instantaneous semidiameter, of the x position distance from the center of the lens.

Additional examples of equations that may be used to design a progressive cylinder power that increases from the center of the optic zone to the periphery are:

$$y = Cyl - Cyl \times \left(\frac{1}{a \times (1 + (x/x_c)^{2n})}\right) \quad (XIII)$$

$$y = Cyl - Cyl \times \left(\frac{1}{(a \times (1 + (x/x_c)^2) \times n)}\right) \text{ and} \quad (XIV)$$

$$y = Cyl - Cyl \times \left(\frac{1}{(a \times (1 + (x/x_c)^d) \times n)}\right) \quad (XV)$$

in each of which, wherein:

y is the instaneous cylinder power at any point x;

$x_c$ is the 50% cutoff in the filter transition, or position in x in which the cylinder power is ½ of the peak;

a is a constant and preferably is 1;

n controls the steepness of the transition and is a value of 1 to 40;

Cyl is the maximum cylinder power; and

X is the instantaneous semidiameter.

One ordinarily skilled in the art will recognize that for contact lens embodiments in which cylinder power is present, a stabilization means will need to be incorporated in the lens. Suitable stabilization means are any of the static and dynamic stabilization means known in the art including, without limitation, prism ballast, thin and thick zones, bosses and the like and combinations thereof.

The lenses of the invention also may incorporate an inverse topographic elevation map of the lens wearers' cornea on one surface of the lens. The corneal topography may be determined by any known method including, without limitation, by use of a corneal topographer. For soft contact lens manufacture, the elevational data initially is applied to a lens model in the unflexed state. Next, the data is transformed by taking into account the soft lens flexure, or wrap, when the lens placed on the eye. Thus, the effects of both elevation of the cornea and wrap are accounted for when using the corneal topographic data. The flexure transformed data then may be mapped onto a CNC grid pattern and used to make the lenses or mold tool surface. Preferably, the topographic data is incorporated onto the back surface of the lens and the progressive addition power zone is on the front surface.

The lenses of the invention preferably are soft contact lenses, made of any material suitable for producing such lenses. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

A preferred lens-forming material is a poly 2-hydroxyethyl methacrylate polymers, meaning, having a peak molecular weight between about 25,000 and about 80,000 and a polydispersity of less than about 1.5 to less than about 3.5 respectively and covalently bonded thereon, at least one cross-linkable functional group. This material is described in Attorney Docket Number VTN 588, U.S. Ser. No. 60/363,630 incorporated herein in its entirety by reference. Suitable materials for forming intraocular lenses include, without limitation, polymethyl methacrylate, hydroxyethyl methacrylate, inert clear plastics, silicone-based polymers, and the like and combinations thereof.

Curing of the lens forming material may be carried out by any means known including, without limitation, thermal, irradiation, chemical, electromagnetic radiation curing and the like and combinations thereof. Preferably, the lens is molded which is carried out using ultraviolet light or using the full spectrum of visible light. More specifically, the precise conditions suitable for curing the lens material will depend on the material selected and the lens to be formed. Polymerization processes for ophthalmic lenses including, without limitation, contact lenses are well known. Suitable processes are disclosed in U.S. Pat. No. 5,540,410 incorporated herein in its entirety by reference.

The contact lenses of the invention may be formed by any conventional method. For example, the optic zone may be produced by diamond-turning or diamond-turned into the molds that are used to form the lens of the invention. Subsequently, a suitable liquid resin is placed between the molds followed by compression and curing of the resin to form the lenses of the invention. Alternatively, the zone may be diamond-turned into lens buttons.

What is claimed is:

1. A contact lens pair, comprising a first lens having a first optic zone comprising a first progressive addition power zone having a first power profile and a second lens having a second optic zone comprising a second progressive addition power zone having a second power profile, wherein the first and second power profiles are different and wherein the first and second progressive addition power zones comprise a center of near vision power that progresses to distance vision power at the progressive addition zones' peripheries.

2. The lens pair of claim 1, wherein the first progressive addition power zone comprises more distance vision power than does the second progressive addition power zone.

3. The lens pair of claim 2, wherein the power profiles differ in that an endpoint for the distance vision power in the first power profile is deviated about 0.1 to about 1.5 mm farther toward the optic zone periphery than is a distance vision endpoint for the second power profile.

4. A method for designing contact lenses, comprising the step of providing a contact lens pair comprising a first lens having a first optic zone comprising a first progressive addition power zone having a first power profile and a second lens having a second optic zone comprising a second progressive addition power zone having a second power profile, wherein the first and second power profiles are different and wherein the first and second progressive addition power zones comprise a center of near vision power that progresses to distance vision power at the progressive addition zones' peripheries.

5. The method of claim 4, wherein the first progressive addition power zone comprises more distance vision power than does the second progressive addition power zone.

6. The method of claim 5, wherein the power profiles differ in that an endpoint for the distance vision power in the first power profile is deviated about 0.1 to about 1.5 mm farther toward the optic zone periphery than is a distance vision endpoint for the second power profile.

* * * * *